Jan. 16, 1940.  E. A. JOHNSTON  2,187,425
TRACTOR CONSTRUCTION
Filed Feb. 24, 1938  2 Sheets-Sheet 2

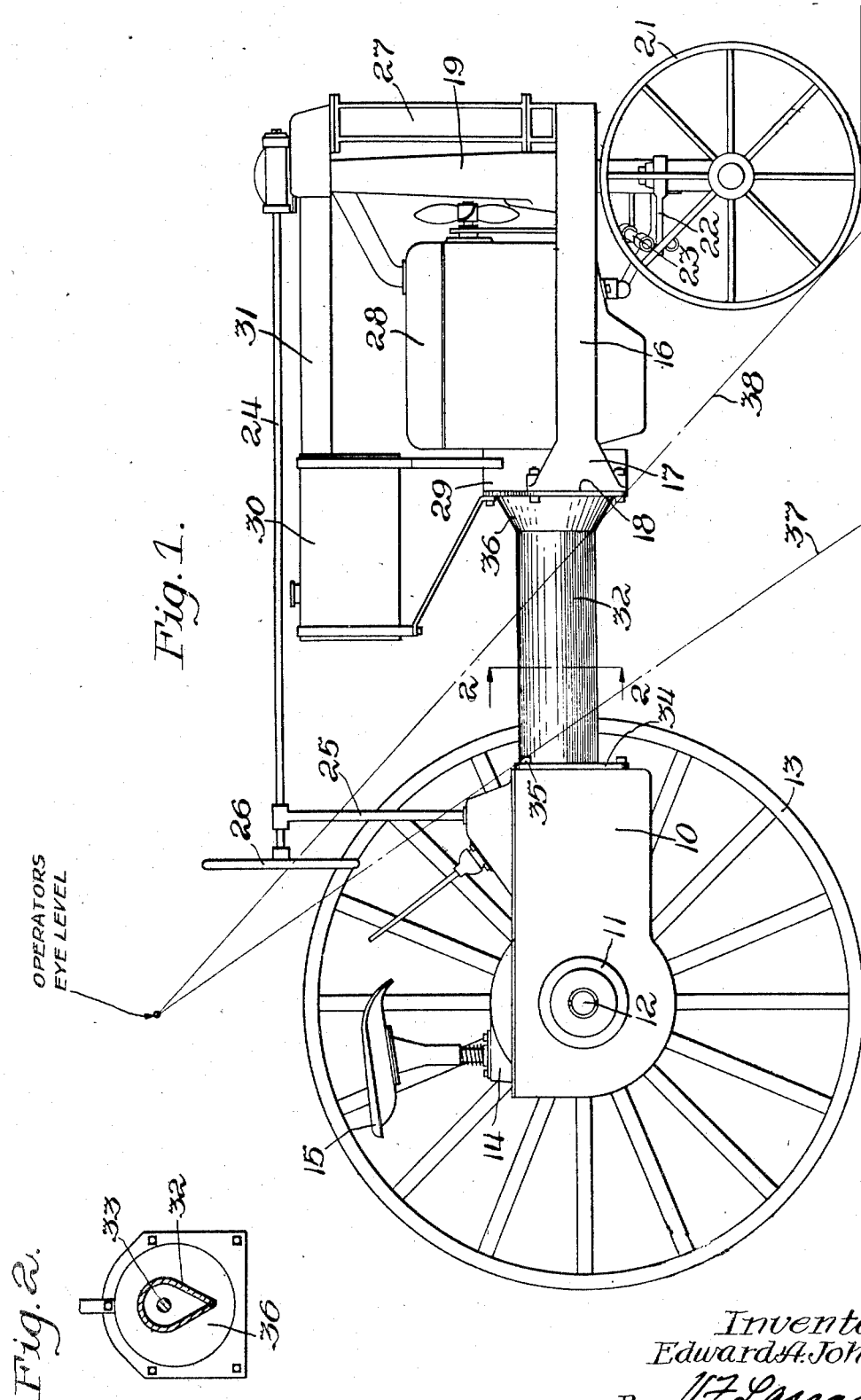

Inventor
Edward A. Johnston
By V. F. Lasagna
Atty.

Patented Jan. 16, 1940

2,187,425

UNITED STATES PATENT OFFICE 2,187,425

TRACTOR CONSTRUCTION

Edward A. Johnston, Chicago, Ill., assignor to International Harvester Company, a corporation of New Jersey Application February 24, 1938, Serial No. 192,204

3 Claims. (Cl. 180—1)

This invention relates to a tractor construction and particularly to improvements in a tractor frame.

In the use of tractors for planting and cultivating row crops, the so-called tricycle type has come into extensive use. This type of tractor is provided with a narrow front support consisting of one or two wheels which run between adjacent rows. The rear axle construction is of a wide tread and carries two traction wheels adapted to run outside of adjacent rows. Tractors of this type are usually supplied with implements for operating simultaneously upon two adjacent rows. As the tractor is comparatively narrow and as the rows are at each side, the question of visibility has not been a problem as an operator seated at the rear of the tractor near the center can, at all times, see both rows.

For smaller tractors designed for one row operation, both the front and the rear wheels straddle the row being operated upon. In a conventional tractor with the engine at the front and with the frame structure extending rearwardly therefrom, it is difficult for an operator to properly view the row being operated upon. Different constructions have been proposed to give the operator better visibility. It is to a tractor construction of this type that the present invention relates.

The principal object of the invention is to provide a tractor frame structure which provides strength to support the tractor and to resist the torques applied thereto, and, at the same time, to give the operator good visibility for observing the row being traversed by the tractor and operated upon by the implements which may be attached thereto.

Another object is to provide a narrow frame with the maximum strength and the minimum width possible with maximum vision.

Another object is to provide a narrow frame for a sufficient length of the tractor frame to give the operator vision over a considerable area in the fore and aft direction and forwardly under the tractor in order to view the plants or the row being operated upon adjacent the steering wheels of the tractor.

The above objects and others, which will be apparent from the detailed description to follow, are accomplished by a construction as shown in the drawings, in which:

Figure 1 is a side elevation of a tractor embodying the improved frame structure, one wheel being removed in order to better show the frame structure;

Figure 2 is a cross section through the tractor frame on the line 2—2 of Figure 1; and, Figure 3 is a plan view of the tractor shown in Figure 1.

Figure 3:
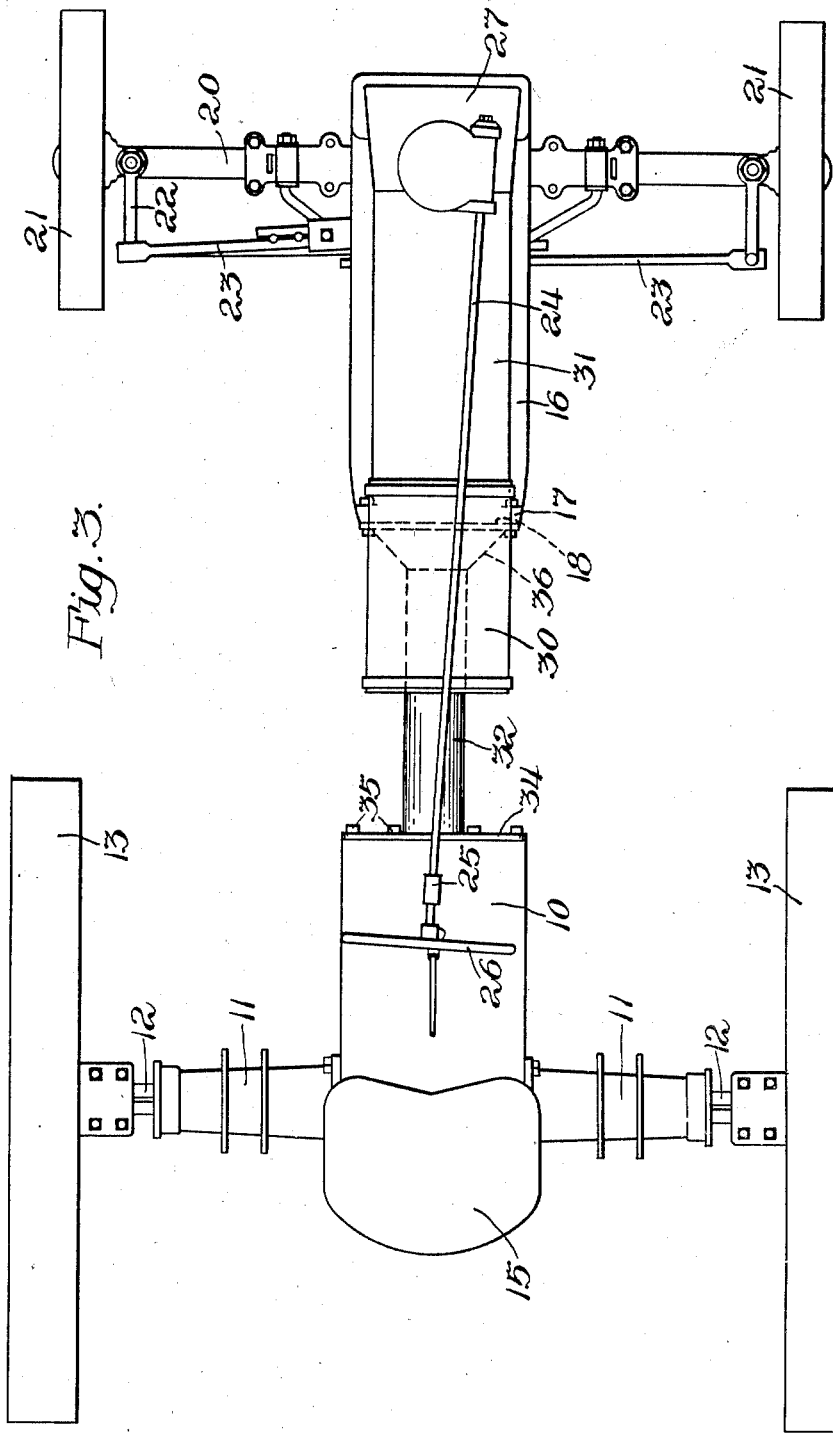

In the drawings, the different units of the tractor have been shown in outline and somewhat diagrammatically, as the novelty resides in the center portion of the frame structure. As illustrated, the tractor embodies a rear frame structure 10 to which laterally extending axle housings 11 are rigidly secured. These elements are perfectly formed as castings. Axles 12 are shown extending from the housings 11, and wheels 13 are shown adjustably clamped on the axles 12.

As shown in Figure 1, a cover 14 for the frame structure 10 provides a support for a resiliently mounted operator's seat 15. The frame structure 10, in addition to serving as the rear frame structure, forms a housing for the transmission of the tractor, the differential gearing and the final drive gearing. These parts may be of any conventional construction.

The forward portion of the tractor is shown as consisting essentially of a front frame structure 16. Said frame structure is shown only in outline, it may be formed of a casing or may be formed of independent side frame members suitably secured together by other means at the front end. At its rear end, the frame structure 16 is formed with attaching portions 17 which are provided with vertical attaching faces 18.

A front bolster construction 19, rigidly secured to the front frame 16, provides means for connecting a transverse front axle 20 on which steerable wheels 21 are mounted. Steering arms 22 are connected by tie rods 23 extending beneath the body of the tractor. Said rods are connected by conventional means, not shown in detail, to the steering mechanism which is carried by the bolster 19. At the top of said bolster, a shaft 24 extends rearwardly being supported by a vertically upstanding member 25 secured to the cover plate 14. A steering wheel 26 is mounted on the rear end of the shaft 24 in a position to be engaged by an operator standing at the rear of the tractor or fitted on the seat 15.

A radiator 27 is shown mounted at the front end of the frame structure 16. An engine 28 is shown as being mounted on the frame structure 16 between the side portions thereof. A flywheel housing 29 of the engine terminates in the same vertical plane as the attaching faces 18 on the portion 17 of the frame structure 16.

A gasoline tank 30 is shown mounted at the rear of the engine 28. The tank is mounted at a height so as not to obstruct the vision of the operator, as will be hereinafter described. A hood member 31 connects the gasoline tank with the top of the radiator 27. It will be understood, as previously noted, that most of the elements are shown only in outline and have been incorporated in the drawing only to show their relative positions on the frame structure of the tractor.

The rear frame structure 10 and the forward frame structure 16 are connected by an intermediate frame structure 32. Said frame structure and its relative location is the essential feature of the invention.

The frame structure 32 is of substantially the same cross section from end-to-end and has a particular shape, as shown in Figure 2, which may be termed pear-shaped or tear-drop-shaped. The upper portion is substantially cylindrical in shape, with each side tapering downwardly to an apex. The upper portion is as narrow as is consistent with providing necessary strength and providing sufficient clearance internally for the drive or propeller shaft 33 which extends longitudinally through the center or hollow portion of the frame structure. By bringing both sides downwardly to an apex, substantial strength may be obtained for resisting vertical loads on the tractor without greatly detracting from the visibility of the operator. By leaning from side to side, the operator's line of vision follows the downwardly slanting side portions of the frame structure, thereby viewing the portion of the ground under the center portion of the tractor. This is an essential feature in the operation of one-row tractors when the row of plants is straddled by the tractor. The cross section, as shown, which is most effective for obtaining the necessary strength and resistance to torque and the best visibility may be termed as tear-dropped in shape.

At the rear end of the intermediate frame structure 10, a flanged attaching portion 34, rigidly attached to the frame structure, provides means for rigidly securing the frame structure to the rear frame structure 10. A plurality of cap screws 35 are illustrated as the securing elements for fastening the two structures together.

At the forward end of the frame structure 32, a conical or bell-shaped housing 36, rigidly attached to the frame structure, forms a clutch housing and is provided with a flange portion which is secured to the fly-wheel housing 29 of the motor and the attaching portion 17 of the front frame structure 16. It will be noted that the flange adjacent the bell housing 36 abuts the attaching faces 18 on the portions 17. Other means may be provided for attaching the forward end of the intermediate frame structure to the front frame structure, the essential feature of the invention being the cross section of the intermediate frame structure and its location longitudinally of the tractor to give the operator a large field of vision in a longitudinal direction and a complete field of vision transversely of the tractor by moving slightly to each side of the center of the tractor.

In the operation of the tractor, implements may be carried directly on or behind the tractor. The construction is particularly adapted to row crop work. An operator on the seat 19 will view the row being straddled by the tractor from an eye level substantially as indicated in Figure 1. The longitudinal field of vision will be approximately as shown on the ground level between the dotted lines 37 and 38. It will be noted that the field of vision extends substantially to the steering wheels of the tractor.

With the operator seated at the center of the tractor, the narrow intermediate frame structure 32 forms only a slight obstruction to vision. By making it as narrow as possible by using the particular shape which forms the subject matter of applicant's invention, the obstruction is of minimum width. By shifting slightly to either side of the center, the operator may sight along the tapered side walls of the frame structure 32 and obtain thereby a view of that portion of the area beneath the tractor, which is normally obstructed by the narrow frame structure 32. Applicant has, therefore, provided a center frame structure for a row crop tractor which gives the minimum obstruction to vision and which permits complete view of the ground by a minimum of effort on the part of the operator. At the same time, a frame structure has been provided which gives sufficient strength against all loads and torques which might be applied in the operation of the tractor.

Although applicant has shown and described a preferred embodiment of his invention, it is understood that he claims all modifications falling within the scope of the appended claims.

What is claimed is:

1. In a row-crop tractor having a wheeled front frame structure adapted to straddle a row of plants, and a rear axle structure which carries final drive gearing and wheels spaced to straddle a row of plants during operation of the tractor, and, in combination therewith, an operator's station at the rear and above the tractor, a tubular structure rigidly connected at its front end to the front frame structure and at its rear end to the rear axle structure and forming the sole load sustaining support, said tubular structure being substantially tear-drop-shaped in cross section with a narrow rounded portion at its upper side with the side portions joining each other at an acute angle at the bottom, said structure providing maximum strength to support vertical loads on the frame structure and providing for lines of vision along the side portions of the tubular structure from points laterally of the operator's station and closely adjacent thereto for observing the row of plants straddled by the tractor.

2. In a row-crop tractor having a forwardly positioned frame structure on which an engine is mounted, a steerable wheeled support for said structure for straddling a row of plants during operation of the tractor, and a rear axle structure which carries final drive gearing and wheels spaced to straddle the row of plants, and, in combination therewith, an operator's station above and at the rear of the tractor, a tubular structure rigidly connected at its front end to the forward frame structure and at its rear end to the rear axle structure and forming the sole load sustaining support and the sole vision obstructing element throughout the central portion of the tractor, said tubular structure being narrow in cross section at its upper side with the side portions sloping inwardly together and joining each other at an acute angle at the bottom, said structure being of a substantial length to provide a substantial area in the fore and aft direction from the operator's station for observing the row of plants straddled by the tractor, the inwardly sloping side portion providing for complete vision of the plant row in a lateral direction from positions closely adjacent the operator's station.

3. In a row-crop tractor, the combination of a frame structure on which an engine is mounted, said frame structure being supported at the front by a pair of wheels adapted to straddle a row of plants during operation of the tractor and at the rear by a pair of traction wheels adapted to straddle said row of plants, the central portion of the frame structure being narrow and tubular and being pear-shaped in cross section with the rounded upper portion at the top and the pointed narrow portion at the bottom, and an operator's station on the tractor at the rear thereof and above the frame structure, said cross section providing maximum strength to support loads on the frame structure consistent with maximum vision for observation of the plant row being straddled from the operator's station.

EDWARD A. JOHNSTON.